(12) United States Patent
Heinrich et al.

(10) Patent No.: US 11,672,074 B2
(45) Date of Patent: Jun. 6, 2023

(54) SHIELDING STRUCTURES IN PLASMA ENVIRONMENT

(71) Applicant: Lockheed Martin Corporation, Bethesda, MD (US)

(72) Inventors: Jonathon Robert Heinrich, Palmdale, CA (US); Thomas John McGuire, Palmdale, CA (US); Gabriel Ivan Font, Palmdale, CA (US); Michael Lane Garrett, Santa Clarita, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 664 days.

(21) Appl. No.: 16/509,286

(22) Filed: Jul. 11, 2019

(65) Prior Publication Data

US 2021/0014957 A1    Jan. 14, 2021

(51) Int. Cl.
  *H01J 37/32*     (2006.01)
  *H05H 1/04*      (2006.01)
  *H05H 1/16*      (2006.01)
  *G21B 1/05*      (2006.01)

(52) U.S. Cl.
  CPC .............. *H05H 1/04* (2013.01); *H05H 1/16* (2013.01); *G21B 1/05* (2013.01)

(58) Field of Classification Search
  CPC .......... H05H 1/16; H05H 1/46; H05H 1/4652; H01J 37/321
  See application file for complete search history.

(56) References Cited

U.S. PATENT DOCUMENTS

| | | | |
|---|---|---|---|
| 3,012,955 A | 12/1961 | Kulsrud et al. | |
| 3,117,912 A | 1/1964 | Imhoff et al. | |
| 3,218,562 A * | 11/1965 | Serduke | H05H 5/06 376/127 |

(Continued)

FOREIGN PATENT DOCUMENTS

| | | |
|---|---|---|
| JP | H07-22231 A | 1/1995 |
| JP | 2001-066389 A | 3/2001 |
| JP | 2008-008906 A | 1/2006 |

OTHER PUBLICATIONS

PCT Notification of Transmittal of the Intl. Search Report and the Written Opinion of the Intl. Searching Authority, or the Declaration, PCT/US2020/040069, dated Nov. 3, 2020.

(Continued)

*Primary Examiner* — Tung X Le
(74) *Attorney, Agent, or Firm* — Baker Botts L.L.P.

(57) ABSTRACT

A plasma confinement system includes an enclosure, one or more internal magnetic coils suspended within the enclosure in a plasma region, and one or more supports configured to support the one or more internal magnetic coils suspended within the enclosure. Each support of the one or more supports includes a first end and a second end opposite the first end. The first end is coupled to an interior portion of the enclosure and the second end is coupled to a component disposed within the plasma region. Each support further includes electrical conducting material disposed between the first end and the second end. The electrical conducting material is configured to, when supplied with one or more electrical currents, generate a magnetic field having a magnetic field gradient that varies along the support from the first end to the second end.

12 Claims, 9 Drawing Sheets

(56) References Cited

U.S. PATENT DOCUMENTS

| | | | |
|---|---|---|---|
| 4,087,322 A | 5/1978 | Marcus | |
| 4,166,760 A | 9/1979 | Fowler et al. | |
| 4,229,679 A | 10/1980 | Lode | |
| 4,252,608 A | 2/1981 | Baldwin et al. | |
| 4,436,691 A | 3/1984 | Jardin et al. | |
| 5,234,529 A * | 8/1993 | Johnson | H05H 1/46 204/298.34 |
| 5,521,351 A * | 5/1996 | Mahoney | C23C 16/045 427/490 |
| 6,077,384 A * | 6/2000 | Collins | H01J 37/32522 156/345.33 |
| 6,593,539 B1 | 7/2003 | Miley et al. | |
| 6,888,907 B2 | 5/2005 | Monkhorst et al. | |
| 7,391,160 B2 | 6/2008 | Monkhorst et al. | |
| 7,719,199 B2 | 5/2010 | Monkhorst et al. | |
| 9,386,676 B2 | 7/2016 | Rostoker et al. | |
| 9,754,686 B2 | 9/2017 | Jarboe et al. | |
| 9,928,926 B2 | 3/2018 | McGuire | |
| 9,928,927 B2 | 3/2018 | McGuire | |
| 9,934,876 B2 | 4/2018 | McGuire | |
| 9,941,024 B2 | 4/2018 | McGuire et al. | |
| 9,947,420 B2 | 4/2018 | McGuire | |
| 9,959,941 B2 | 5/2018 | McGuire | |
| 9,959,942 B2 | 5/2018 | McGuire | |
| 2005/0127836 A1 | 6/2005 | Plumeyer et al. | |
| 2007/0234705 A1* | 10/2007 | Emsellem | F03H 1/0081 60/202 |
| 2011/0170647 A1* | 7/2011 | Bussard | G21B 1/05 376/129 |
| 2016/0011290 A1* | 1/2016 | Iannello | G01R 33/448 600/422 |
| 2017/0359886 A1 | 12/2017 | Binderbauer et al. | |
| 2018/0047461 A1 | 2/2018 | Cohen et al. | |
| 2018/0063936 A1 | 3/2018 | Prater | |

OTHER PUBLICATIONS

KIPO's Notice of Last Preliminary Rejection Re KR 10-2015-7031314 (with English translation), dated Nov. 24, 2020.

Brazil Patent Office, Search Report, BR112015025235-4; PCT US2014/032757, dated Mar. 31, 2021.

Session BP11: Poster Session 1: Space and Astrphysical Plasmas; FRC; PMI; Energetic Particles; Other Concepts; Measurement and Diagnostic Techniques; Laser-Plasma Instabilities; 59th Annual Meeting of the APS Division of Plasma Physics, vol. 62, No. 12—Oct. 23, 2017.

NATURE by B. Lehnert; No. 4605, vol. 181, 1958 Nature Publishing Group—Feb. 1, 1958.

Magnetic Shielding of Current Feeds in Plasma Containment Systems by L.C. Burkhardt et al.; The Physics of Fluids 11, 1562-1968.

Direct Measurement of the Plasma Loss Width in an Optimized, High Ionization Fraction, Magnetic Multi-Dipole Ring CUSP by C.M. Cooper et al.; Physics of Plasmas 23, 102505—2016.

On the Confinement of Charged Particles in a Magnetic Field by B. Lehnert 1959 J. Nucl. Energy, Part C Plasma Phys. 1 40; Journal of Nuclear Energy. Part C, Plasma Physics, Accelerators, Thermonuclear Research—1959.

Plasma Confinement in Presence of Magnetically Shielded Supports by B. Lehnert 1975 Plasma Phys. 17 501; Plasma Physics—1975.

Motion of Charged Particles Along a Magnetic Neutral Line. I. Diffusion by V.A. Mason and M.G. Rusbridge 1979 Plasma Phys. 21 907; Plasma Physics—1979.

Shielded Supports in Toroidal Multipoles by M.G. Rushbridge 1971 Plasma Phys. 13 33; Plasma Physics—1971.

Magnetic Guarding of Octupole Hoop Supports by Arthur W. Molvik; The Physics of Fluids 15, 1128—1972.

Lack of Equilibrium Due To Magnetic Guarding by D.M. Meade; The Physics of Fluids 11, 2497—1968.

Non-Adiabatic Charged Particle Motion Near a Magnetic Field Zero Line by M.G. Rusbridge 1971 Plasma Phys. 13 977—1971.

Plasma Confinement and Heating in the Internal Ring Device F IV by B. Lehnert et al., Royal Institute of Technology, Stockholm, Sweden; Plasma Phys. and Cont. Nucl. Fus. Res., IAEA. 28, 4, 59—1971.

High-Energy Gun-Injected Toroidal Quadrupole by J.E. Hammel et al., Los Alamos Scientific Laboratory, Plasma Phys. and Cont. Nucl. Fus. Res., IAEA. 28, 7, 97—1971.

Plasma Confinement in a Toroidal Octupole Magnetic Field by H. Forsen et al., University of Wisconsin; Plasma Phys. and Cont. Nucl. Fus. Res., IAEA. 24, 1, 313—1969.

IP India, Examination Report Application No. 9885/DELNP/2015, dated Oct. 4, 2021.

IP India, Examination Report Application No. 9883/DELNP/2015, dated Oct. 5, 2021.

\* cited by examiner

SHIELDING STRUCTURES IN PLASMA ENVIRONMENT

TECHNICAL FIELD

This disclosure relates in general to plasma confinement, and more particularly to shielding structures in plasma environments.

BACKGROUND

Fusion power is power that is generated by a nuclear fusion process in which two or more atomic nuclei collide at very high speed and join to form a new type of atomic nucleus. A fusion reactor is a device that produces fusion power by confining and controlling plasma.

Certain components of a fusion reactor or a plasma confinement device may be immersed in or exposed to plasma. Exposure to plasma may damage or otherwise interfere with the operation of components of the fusion reactor or plasma confinement device. Additionally, interference by components of the plasma confinement device to the plasma or electromagnetic fields contingent thereupon may reduce the efficiency and/or stability of confining and/or controlling the plasma.

SUMMARY OF THE DISCLOSURE

Obstacles, such as supports, functional structures, diagnostic equipment, etc., in plasma (e.g., used in fusion) may result in significant collection of ions and electrons at or near these obstacles. Plasma losses due to the obstacles can strongly modify the plasma density and temperature, which is typically undesirable. As a result, non-perturbative optical and beam techniques to measure plasma parameters have been required to account for such complex interactions. Further, some designs for confinement systems utilize complicated and expensive levitation techniques for creating magnetic field geometries of interest to high-beta fusion in order to reduce the number of obstacles within plasma to avoid some of these issues. Additionally, this problem prevents realistic exploration of certain classes of magnetic fusion concepts that require components, such as electromagnetic coils, to be immersed in or otherwise surrounded by plasma. Accordingly, certain embodiments address this problem by shielding obstacles in plasma using magnetic field guarding and shaping.

According to one embodiment, a plasma confinement system includes an enclosure, one or more internal magnetic coils, and one or more supports. The one or more internal magnetic coils are suspended within the enclosure in a plasma region. The one or more supports support the one or more internal magnetic coils suspended within the enclosure. Each support of the one or more supports includes a first end, a second end opposite the first end, and electrical conducting material. The first end is coupled to an interior portion of the enclosure. The second end is coupled to a component disposed within the plasma region. The electrical conducting material is disposed between the first end and the second end. The electrical conducting material is configured to, when supplied with one or more electrical currents, generate a magnetic field having a magnetic field gradient that varies along the support from the first end to the second end.

According to another embodiment, a support includes a first end, a second end, and electrical conducting material. The first end is coupled to an interior portion of an enclosure of a plasma confinement system. The second end is opposite the first end and the second end is coupled to a component disposed within a plasma region. The electrical conducting material is disposed between the first end and the second end. The electrical conducting material is configured to, when supplied with one or more electrical currents, generate a magnetic field having a magnetic field gradient that varies along the support from the first end to the second end.

According to yet another embodiment, a method includes disposing one or more internal magnetic coils suspended within a plasma region of an enclosure. The method further includes using one or more supports to support the one or more internal magnetic coils suspended within the enclosure. The one or more supports are disposed at least partially within the plasma region. The method further includes generating a magnetic field along each of the one or more supports, the magnetic field having a non-zero magnetic field gradient along a length of the support to and from the supported internal magnetic coil, the magnetic field generated using a current supplied to electrical conducting material disposed within each of the one or more supports.

Each of the embodiments summarized above may have one or more variations or optional features that may provide one or more additional or different advantages. Non-limiting examples of such variations and/or optional features are disclosed herein, but further variations and/or features may be suitably understood in light of the disclosure, including the detailed description, claims, and accompanying drawings.

The present disclosure may provide numerous technical advantages. For example, certain embodiments provide a support for a component immersed in plasma that generates a magnetic field with a non-zero magnetic field gradient along the length of the support. In this manner, the magnetic field may be superimposed with an existing magnetic field thereby reducing the incidence of plasma on the component, the support, or an enclosure in which the plasma is confined. In another example, certain embodiments provide electrical conducting material within a support that includes windings of conducting material that is configured to create a magnetic field with non-zero gradient. In this manner, the windings may be configured in a variety of ways to provide the magnetic field that minimized plasma losses. As yet another example, certain embodiments further reduce plasma losses to the support by providing a slot through which plasma may pass. Although the provided magnetic fields of the support may shield the support, the slot may allow plasma following certain magnetic field lines to pass through support without impacting the support.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Previous attempts to shield or "guard" objects and other obstacles from plasma using magnetic fields has been met with skepticism and controversy. For example, previous attempts to use dipole magnetic fields to shield obstacles in plasma have encountered problems of how to implement the magnetic field shielding in different geometries and across various plasma environments. Accordingly, different schemes for protecting and shielding components from plasma have been contemplated, including removing components from plasma regions, e.g., by levitation of internal components, and avoiding immersing components in plasma regions, thereby limiting the potential configurations of plasma confinement systems.

As detailed herein, improvements to magnetic field shielding are proposed by creating a magnetic field around a support structure, such as a support for an electromagnetic coil disposed in a plasma region, that has a non-zero gradient along the length of the magnetic field. As a result, impacts of plasma on internal components, including components other than the support structure, of the plasma confinement device may be minimized.

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 7, where like numbers are used to indicate like and corresponding parts.

Plasma can be confined with electromagnetic fields and if heated, can be made to produce net energy via nuclear fusion reactions. These fields can be created by electrodes and/or magnetic field coils. Often these are external to the plasma confinement chamber, but some configurations require vacuum compatible, internal components. These internal electrodes and/or magnetic field coils may require mechanical support and protection from the hazardous nature of the plasma environment, without severely disrupting the plasma.

Figure 1A:
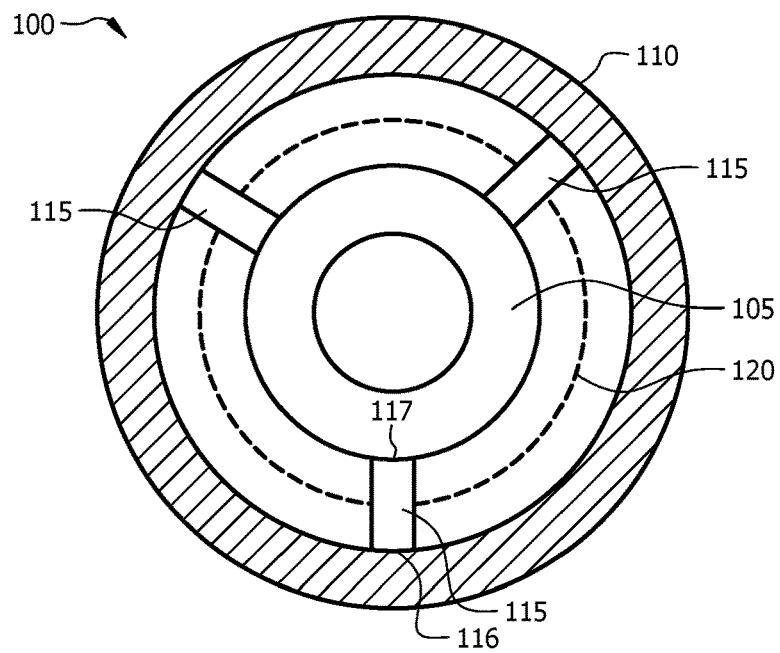
FIGS. 1A and 1B illustrates an example plasma confinement system having an internal magnetic coil in a plasma region supported by one or more supports, according to certain embodiments.
Figure 1B:
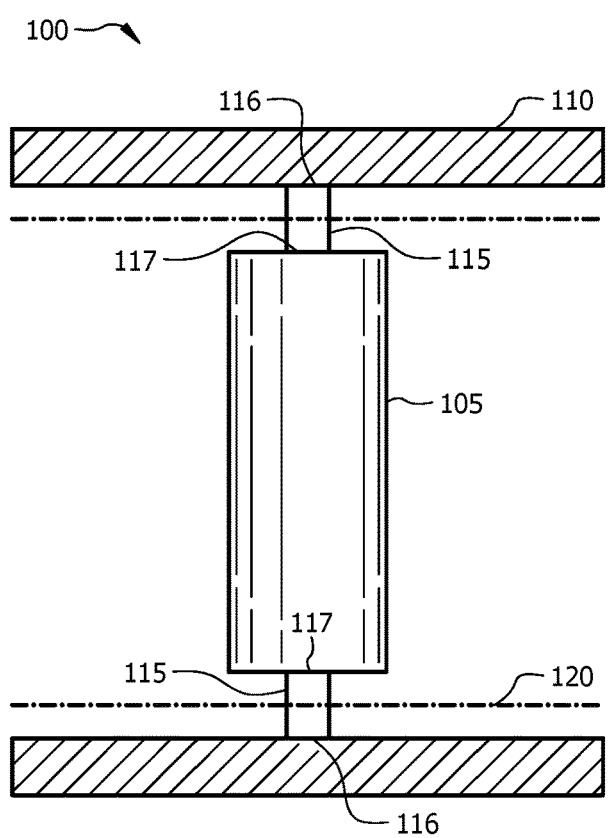

FIGS. 1A and 1B illustrate an example plasma confinement system 100 having an internal magnetic coil 105 in a plasma region 120 supported by one or more supports 115, according to certain embodiments. Plasma confinement system 100 may be any system that uses components, such as internal magnetic coil 105, that may be exposed to plasma and may require structures supporting those components, e.g., supports 115. For example, plasma confinement system 100 may utilize magnetic fields generated using internal magnetic coil 105, and optionally magnetic fields generated via other coils (e.g., coils or other magnets outside or embedded within enclosure 110) or other coils coaxial with internal magnetic coil 105, to control and confine plasma within a plasma region 120.

Prior internal-to-plasma components have been supported via cables, insulated feedthroughs, or levitated by external magnetic fields. Each of these approaches pose problems. Cables may provide structural support, but provide no isolation from the plasma. Cables may also be disruptive to the plasma environment as flow around the cables may not be smooth, and cable surfaces are often rough. Insulated feedthroughs usually only provide one service, such as power, cooling, or diagnostics, and may be made of ceramic materials. Ceramic materials are brittle, and may provide little support. Also, a ceramic surface may suffer from electrical charging as the plasma deposits charge on the surface that can disrupt the plasma environment. External levitation is an overly complex approach and cannot be sustained indefinitely. External levitation is therefore an inadequate solution for maintaining steady-state operation, which may be desirable for operating a fusion reactor. Some embodiments of the present disclosure may address these and other deficiencies of existing approaches by using one or more support stalks, such as supports 115, to provide protection from the plasma environment in addition to mechanical support and in service of electrical, diagnostics, and cooling lines, in a manner designed to minimize deleterious effects on plasma confinement.

In general, support 115 may provide mechanical support for internal magnetic coil 105 of plasma confinement system 110. Internal magnetic coil 105 may require special support mechanisms at least in part because they may be immersed in plasma, e.g., in plasma region 120. In some embodiments, one or more supports 115 may mechanically support internal magnetic coils 105 and be able to withstand sustained contact with the plasma environment without disrupting or minimizing disruption to the plasma environment. In some embodiments, supports 115 may include an internal cavity through which any suitable components may extend into the interior of internal magnetic coil 105. For example, components used to supply electricity to generate magnetic fields with internal magnetic coil 105 or components used to cool or provide diagnostics within internal magnetic coil 105 may extend through the interior of supports 115.

FIG. 1A illustrates three supports 115 supporting internal magnetic coil 105 within plasma confinement system 100, in accordance with certain embodiments. Although FIG. 1A illustrates a trio of supports 115, the present disclosure contemplates that any suitable number of supports 115 may be used to support internal magnetic coil 105 or each internal magnetic coil 105 that may be disposed within plasma region 120. For example, in some embodiments each internal magnetic coil 105 may be supported by two or one supports 115. The present disclosure contemplates that the one or more supports 115 may have any suitable shape. For example, supports 115 may have ellipsoid or circular cross-sections.

In some embodiments, supports 115 may each be coupled to enclosure 110 at a first end 116 of support 115 and to internal magnetic coil 105 at a second end 117 The present disclosure contemplates that support 115 may be coupled to internal magnetic coil 105 and enclosure 110 in any suitable manner. As an example, support 115 may be welded to internal magnetic coil 105 and enclosure 110. As another example, support 115 may be coupled to internal magnetic coil 105 and enclosure 110 using any suitable number of any suitable fasteners. The present disclosure contemplates the use of any suitable combination of materials for coupling support 115 to internal magnetic coil 105 and enclosure 110. In some embodiments, the one or more supports 115 may be modular, which may advantageously allow for easier replacement and/or servicing of supports 115.

In some embodiments, support 115 may provide mechanical support for suspending internal magnetic coil 105 in plasma region 120. In some embodiments, support 115 can be placed in tension or compression. Support 115 may be formed from any suitable material or combination of materials. As an example, support 115 may be formed from stainless steel or tungsten. As another example, support 115 may be formed from aluminum coated with tungsten. The one or more materials used for forming support 115 may vary according to particular applications of support 115 within plasma confinement system 100. As an example, in some embodiments internal magnetic coil 105 may weigh substantially more than in other embodiments, possibly necessitating use of a material better suited for supporting a heavier internal magnetic coil 105.

Support 115 may be located in any suitable area of enclosure 110. In some embodiments, support 115 may be immersed or partially immersed in plasma region 120. In some embodiments, support 115 may be located in plasma confinement system 100 in an area where the concentration of plasma in plasma region 120 is weakest, such as in a recirculation zone, e.g., where plasma circulates around internal magnetic coil 105 and/or between internal magnetic coil 105 and another magnetic coil within plasma region 120. Support 115 may be adapted to withstand exposure to plasma within enclosure 110 without having a deleterious effect on confinement or control of plasma.

As discussed above, supports 115 may have any suitable shape. In some embodiments, support 115 may have a cross-sectional shape of an ellipsoid. In some embodiments, the ellipsoid shape may allow plasma to flow smoothly around support 115, which may advantageously prevent deleterious effects on plasma confinement by support 115. In some embodiments, the cross-section of support 115 is thinner in a direction orthogonal to the magnetic field. Orienting support 115 in such a manner may advantageously result in reduced plasma flux to the surface, while still providing stiffness. In some embodiments, the surface of support 115 may be coated to provide sputtering resistance to impacting plasma.

An example of a plasma confinement system in which one or more internal magnetic coils, such as internal magnetic coil 105, are disposed within a plasma region, e.g., plasma region 120, is provided in U.S. Pat. No. 9,959,941 issued May 1, 2018, which is hereby incorporated by reference. While certain embodiments and examples disclosed herein may make reference to a particular plasma confinement system. Certain techniques and apparatuses disclosed herein may be implemented in any suitable confinement system in which components are disposed in a region of plasma and require some mechanical support.

Figure 2A:
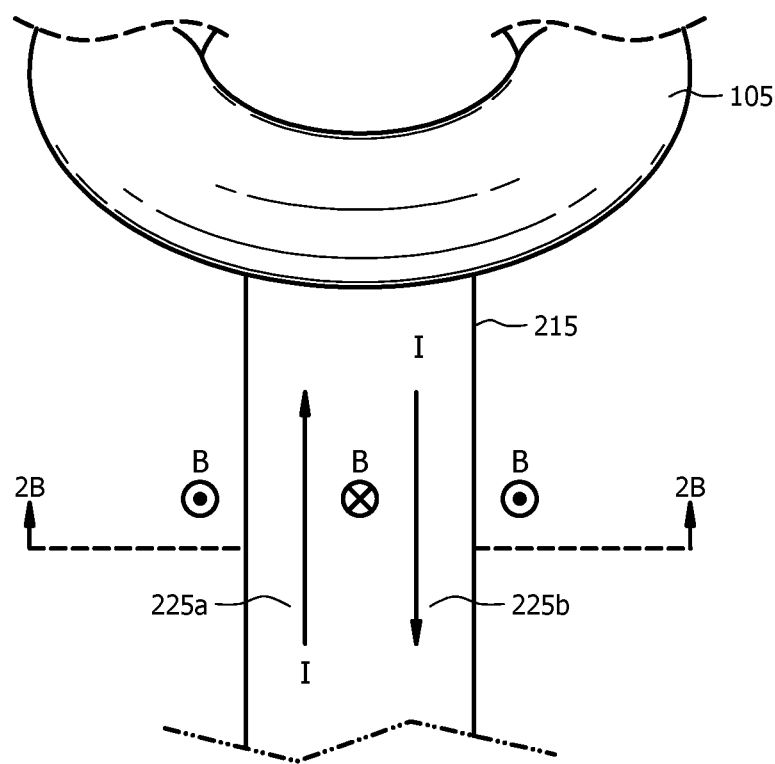
FIGS. 2A and 2B illustrate an example support configured to generate a magnetic field for shielding against plasma, respectively, according to certain embodiments.
Figure 2B:
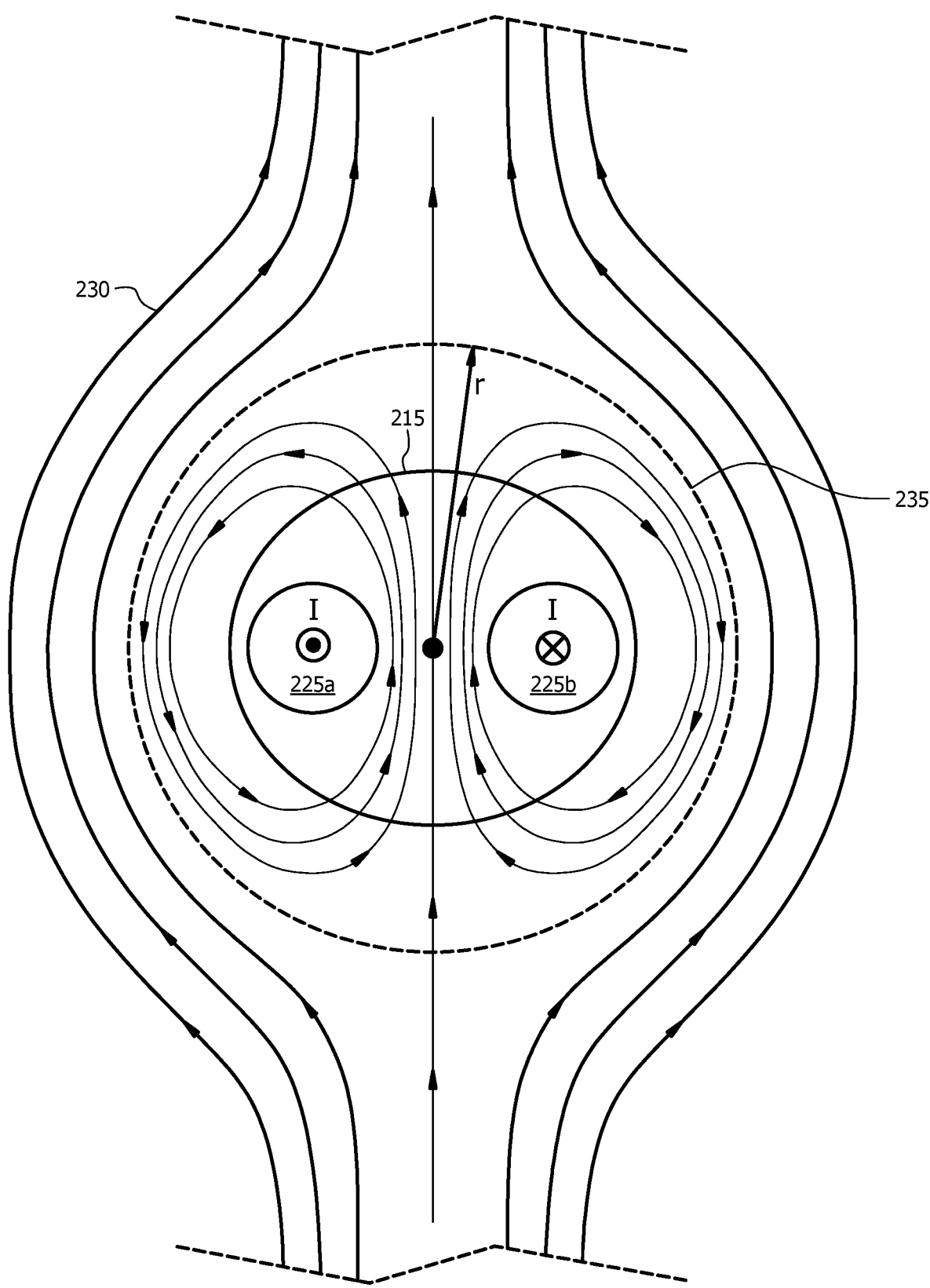

FIGS. 2A and 2B illustrate an example support 215 configured to generate a magnetic field "B" for shielding against plasma, respectively, according to certain embodiments. FIG. 2A illustrates an example support 215 that is configured to have currents 225a and 225b flow through support 215. As shown in this particular example, currents 225a and 225b flow in opposite directions, e.g., from enclosure 110 to internal magnetic coil 105 and from internal magnetic coil 105 to enclosure 110. Each current 225a and 225b generates a magnetic field, which due to the superposition principle, generates a single combined magnetic field designated by symbol B. As shown in FIG. 2A, the magnetic field B is generally oriented into the page between currents 225a and 225b in support 215 and out of the page outside currents 225a and 225b and outside support 115.

In some embodiments, currents 225a and 225b may be carried by electrical conducting material disposed within support 215. For example, support 215 may include one or more wires or other deposition of material that is configured to conduct electricity. In some embodiments, currents 225a and 225b are carried by first portions and second portions of electrical conducting material, respectively. For example, current 225a may be carried by first portions of electrical conducting material disposed within support 215 and current 225b may be carried by second portions of electrical conducting material disposed within support 215. In some embodiments, first and second portions may be coupled together as different portions of a coiled wiring having one or more windings. For example, first portions may be the portions of the windings that carry current in a first direction from enclosure 110 to internal magnetic coil 105 and second portions may be the portions of the windings that carry current in a second direction from internal magnetic coil 105 to enclosure 110. Any suitable configuration of conducting material that can carry current within support 215 is contemplated herein.

FIG. 2B illustrates a cross-sectional view of support 215. Currents 225a and 225b are oriented along the length of support 215 and into and out of the page, respectively. FIG. 2B illustrates example magnetic field lines 230 in the illustrated cross-section plane that may result from the pair of currents 225a and 225b. As shown, the field lines 230 may be open or closed. For example, the magnetic field lines 230 nearer currents 225a and 225b are tighter and closed loops. However, at a certain distance from a midpoint between currents 225a and 225b, the field lines 230 are spread further apart and no longer closed loops. The boundary 235 between closed and open magnetic field lines 230 may be referred to as a flux boundary or a magnetosphere. Boundary 235 may be defined by one or more parameters, including a radius "r" that defines the distance between a midpoint between currents 225a and 225b and the transition point between open and closed magnetic field lines 230. Radius "r" may vary according to the particular configuration of currents 225a and 225b. Generally, radius "r" may be larger if larger currents are provided through support 215. As detailed further herein, the boundary 235 and its associated magnetosphere radius "r" may be configured to vary along the length of support 215.

In certain embodiments, the magnetic fields shown in the example of FIGS. 2A and 2B may be generated without flowing one or more currents through support 215. For example, in some embodiments, the magnetic fields may be generated using a combination of permanent magnets. The use of permanent magnets may reduce the need to provide currents and electrical conducting material within support 215. However, the use of permanent magnets may limit the geometries of magnetic fields that may be realized and/or the availability of certain levels of magnetic field strengths.

FIGS. 3A-D illustrate various example configurations of support 215 that generate magnetic fields having non-zero gradients, according to certain embodiments. As mentioned above, boundary 235 and its associated magnetosphere radius "r" may be configured to vary along the length of support 215. The variation of the magnetosphere radius "r" may have several benefits. For example, depending on the configuration of plasma confinement device 100 and its constituent components, such as internal magnetic coil 105, plasma within plasma region 120 may be subject to a plasma pressure, e.g., via the magnetic field controlling/confining the plasma, that causes the plasma to impact internal magnetic coil 105 and/or enclosure 110 with greater incidence. Accordingly, the magnetic field generated by supports 215 may be configured to counteract some of the "drift" experienced by the plasma and thereby reduce plasma losses to internal magnetic coil 105 and/or enclosure 110. In particular, the magnetic field of support 215 may be superimposed on the magnetic field of plasma confinement system 100 to result in a more stable plasma region 120.

Figure 3A:
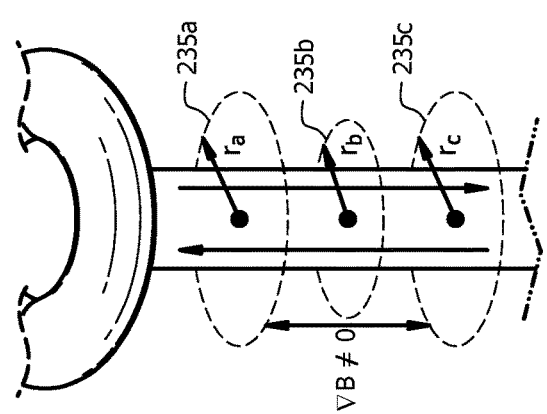
FIGS. 3A-3D illustrate various example configurations of supports for internal magnetic coils configured to generate magnetic fields having non-zero gradients, according to certain embodiments.

The variation of the magnetic field along support 215 may be represented by a varying magnetosphere radius "r" along support 215 between internal magnetic coil 105 and enclosure 110. FIG. 3A illustrates a configuration of support 215 wherein the magnetosphere radius "r" varies along support 215 and thereby provides a magnetic field with a non-zero gradient, e.g., $\nabla B \neq 0$ along support 215. In particular, FIG. 3A illustrates a configuration of support 215, e.g., by a particular configuration of the currents within support 215, such that the resulting magnetic fields have magnetosphere radii ra, rb, and rc. In this particular example, ra is larger than rb and rc is larger than rb. As a result, the magnetosphere radius "r" decreases and then increases along the length of support 215.

Figure 3B:
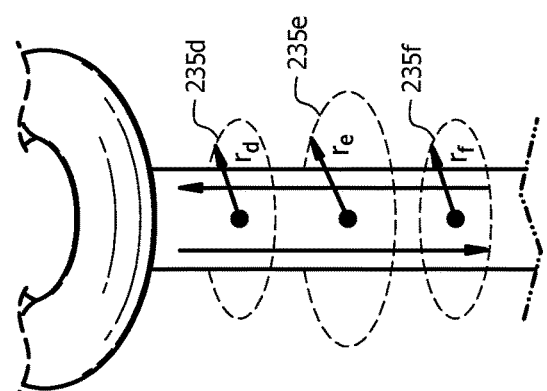

According to another embodiment, FIG. 3B illustrates a configuration of support 215 having magnetosphere radii rd, re, and rf. In this particular configuration, rd is less than re and rf is less than re. Accordingly, the magnetosphere radius "r" increases and then, decreases along the length of support 215.

Figure 3C:
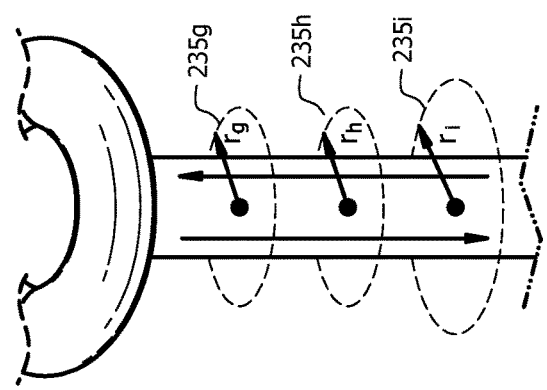
Figure 3D:
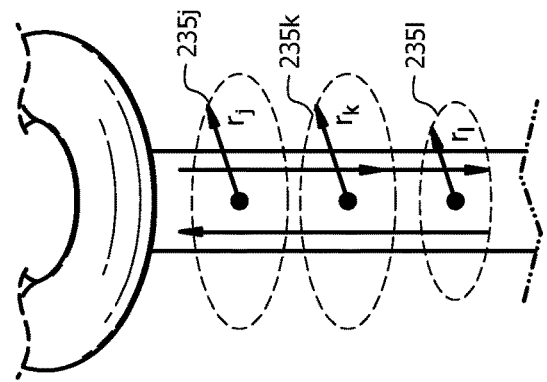

According to another embodiment, FIG. 3C illustrates a configuration of support 215 having magnetosphere radii rg, rh, and ri. In this example, the magnetosphere radius "r" only decreases from enclosure 110 to internal magnetic coil 110. According to another embodiment, FIG. 3D illustrates a configuration of support 215 having magnetosphere radii rj, rk, and rl. In this example, the magnetosphere radius "r" only increases from enclosure 110 to internal magnetic coil 110. In some embodiments, the decrease/increase of the magnetosphere radius along length of support 215 may be uniform, linear, non-linear, step-wise, or any other suitable variation.

While FIGS. 3A-D provide particular example configurations of support 215 in which the magnetosphere radius "r" varies along the length of support 215, any other suitable configuration that may reduce plasma losses is contemplated herein. For example, different configurations of plasma confinement system 100 may warrant different magnetic field configurations of support 215 to reduce plasma losses. As another example, supports for different coils in plasma confinement system 100 may be subject to different magnetic field topology, requiring different superimposed magnetic fields from support 215. Accordingly, any suitable configuration of support 215 generating a magnetic field with a non-zero gradient along support 215 is contemplated herein and in light of the understanding of a person having ordinary skill in the art.

Figure 4:
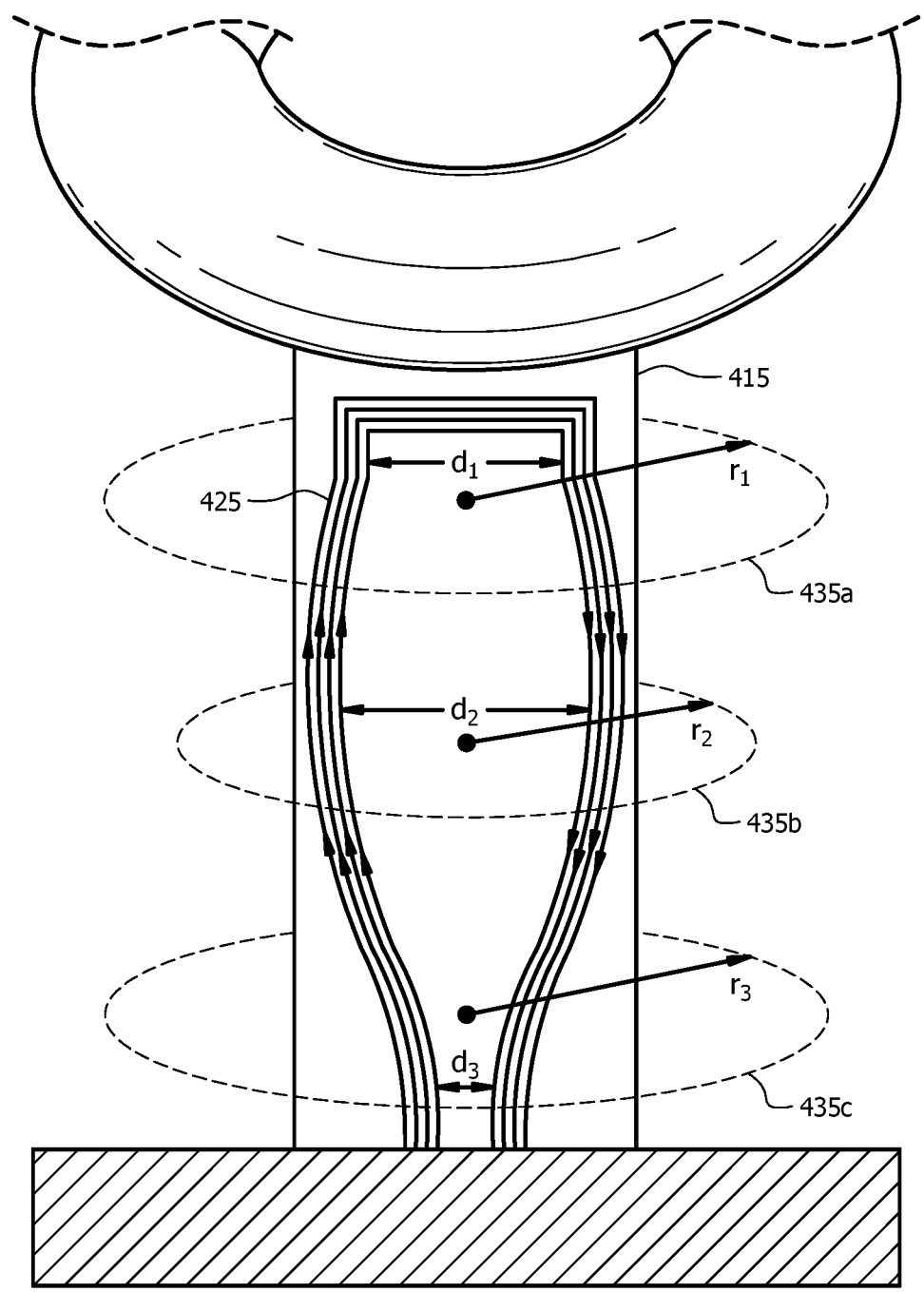
FIG. 4 illustrates an example support having electrical conducting material in a particular configuration, according to certain embodiments.

FIG. 4 illustrates an example support 415 having electrical conducting material 425 in a particular configuration. Support 415 may have disposed within electrical conducting material 425 that has one or more loops or windings, as shown in the illustrated example of FIG. 4. In some embodiments, electrical conducting material 425 includes one or more windings of a metal wire or coil that is configured to conduct current within support 415. In certain embodiments, electrical conducting material 425 is disposed within support 415 such that a magnetic field with a non-zero gradient is produced when one or more currents flow through electrical conducting material 425. For example, the distances d1, d2, and d3 between portions of electrical conducting material 425 in which current is flowing in opposite directions may vary along the length of support 415. In particular, opposite portions of electrical conducting material 425 may be a first distance d1 apart proximate internal magnetic coil 105, a second distance d2 apart near a middle of support 415, and a third distance d3 apart proximate enclosure 110.

The relative values of d1, d2, and d3 may be chosen based on the desired variation of the magnetic field (e.g., the profile of the gradient of the magnetic field) along support 415. Specifically, the configuration of electrical conducting material 425 within support 415 may be chosen based on the particular configuration of the magnetic field. In the illustrated example of FIG. 4, d1 is smaller than d2 and d2 is larger than d3. Accordingly, the corresponding magnetosphere radius r1 is larger than r2, and r2 is less than r3.

In the above example, the effective magnetosphere radius for support 415 decreases and then increases along the length of support 415 based on the variation of the distance between portions of electrical conducting material 425 within support 415. This represents only one such configuration and variations of the configuration of electrical conducting material 425 within support 415 are expressly contemplated for any magnetic field having a non-zero gradient along the length of support 415, including configurations shown in FIG. 3A-D and any others that may be recognized by persons having ordinary skill in the art.

Figure 5B:
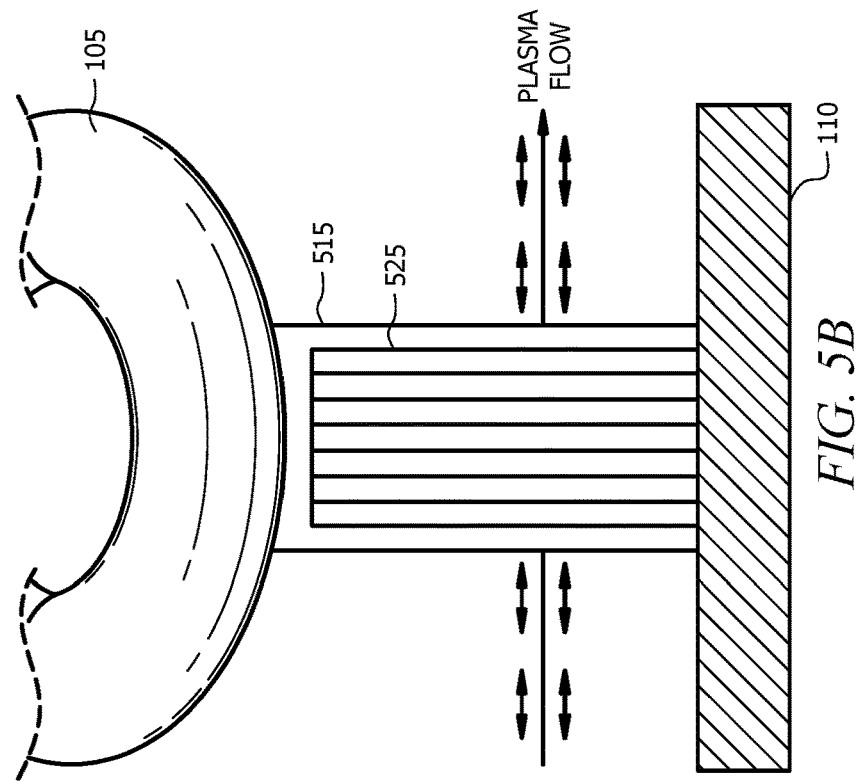
FIGS. 5A-C illustrate an example support defining a slot through which plasma may flow, according to certain embodiments.
Figure 5A:
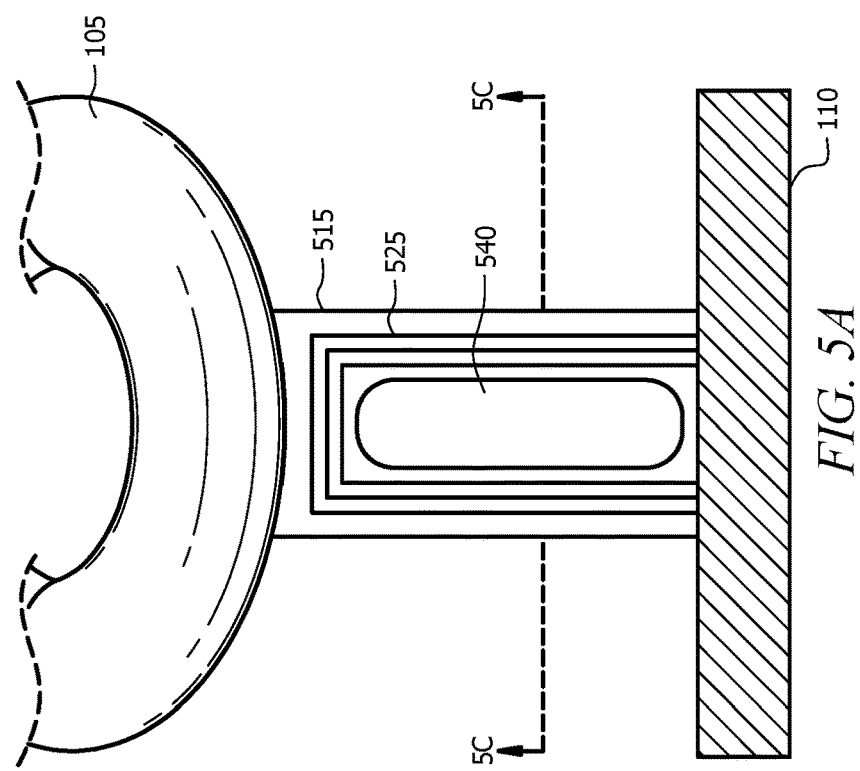
Figure 5C:
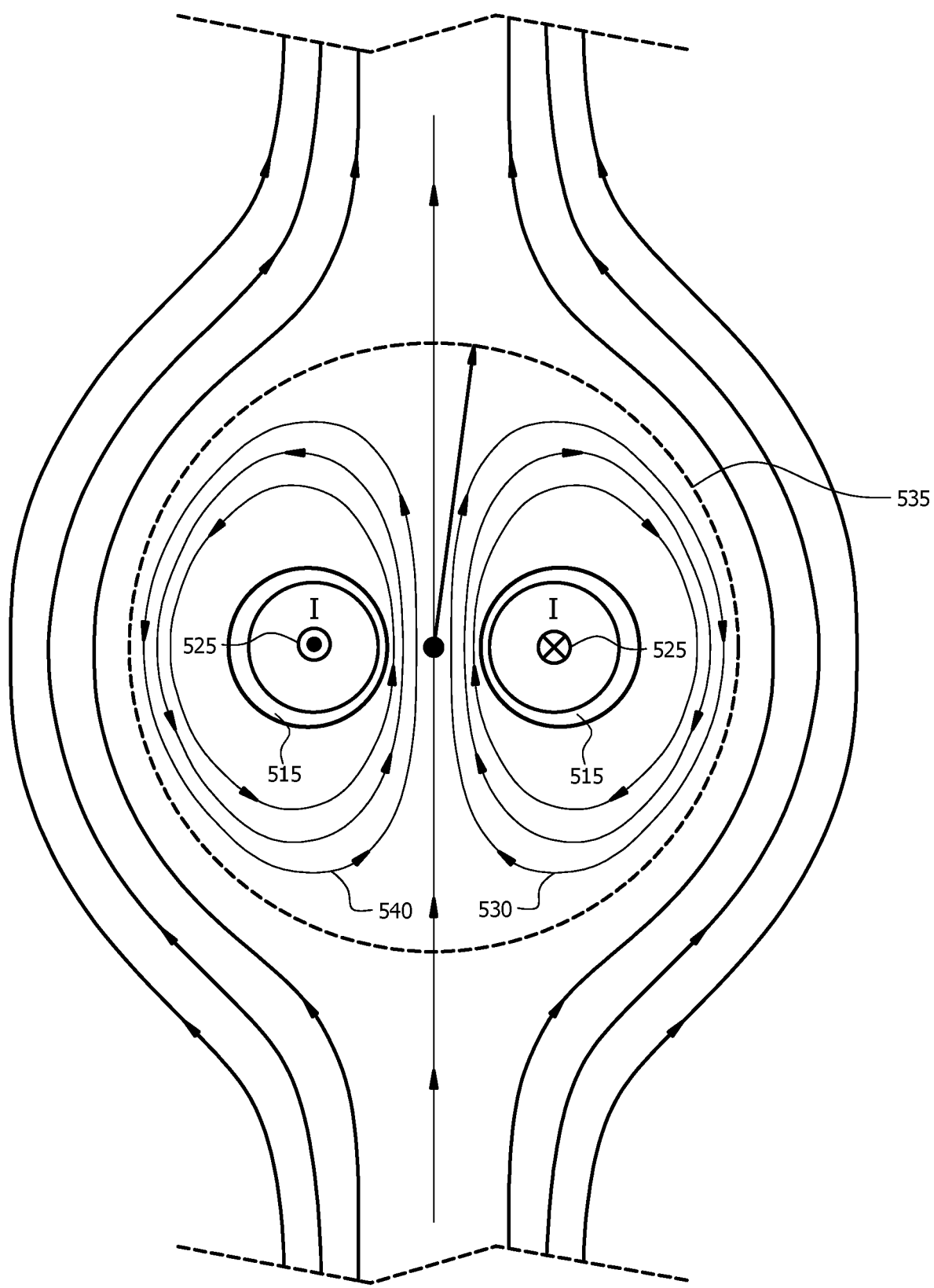

FIGS. 5A-C illustrate an example support 515 defining a slot 540 through which plasma may flow, according to certain embodiments. Support 515 may include electrical conducting material 525 in which current may flow to produce a magnetic field shielding support 515. Electrical conducting material 525 may have any suitable configuration, including configurations discussed above that produce magnetic fields having a non-zero gradient along the length of support 515. Additionally, support 515 defines a slot 540 in which the material making up support 515 and electrical conducting material 525 is not present.

While the magnetic field generated by support 515 may have a shielding effect, e.g., based on the effective boundary defined by the magnetosphere radius, the produced magnetic field may still allow plasma to flow towards support 515 and impact it. For example, as shown in FIG. 5C, there are one or more magnetic field lines 530 that begin outside of magnetosphere boundary 535, enter within boundary 535, and exit again outside boundary 535. Plasma may travel along magnetic field lines 530 and therefore, may not be completely excluded from the region within boundary 535. As a result, plasma may attempt to follow a magnetic field line that leads the plasma to impact a portion of support 515.

In certain embodiments, support 515 defines slot 540 such that the orientation of slot 540 matches the orientation of the magnetic field lines between the opposite portions of electrical conducting material 525. For example, slot 540 may be defined to have an axial direction that is the same as the magnetic field line. As shown in FIG. 5B, slot 540 may be oriented in the plasma flow direction. In this manner, plasma that is not redirected via the shielding magnetic fields of support 515 may flow through slot 540 instead of impacting support 515.

The size and shape of slot 540 may be defined to minimize impacts of plasma with support 515. For example, the size of slot 540 may be maximized given the necessary mechanical strength of support 515 and/or the required space and configuration of electrical conducting material within support 515. For example, if a winding configuration, as illustrated in FIGS. 5A-5C, is used, then slot 540 may be defined in the middle portion of support 515 where there is no electrical conducting material 525. In some embodiments, slot 540 may be an elongated hole and in a specific embodiment, slot 540 may have an oval or circular shape.

Although slot 540 is provided in example support 515, slot 540 or any similar cutout or hole may be used in conjunction with any configuration or features of supports 215, 415, 515, 615 disclosed herein.

Figure 6:
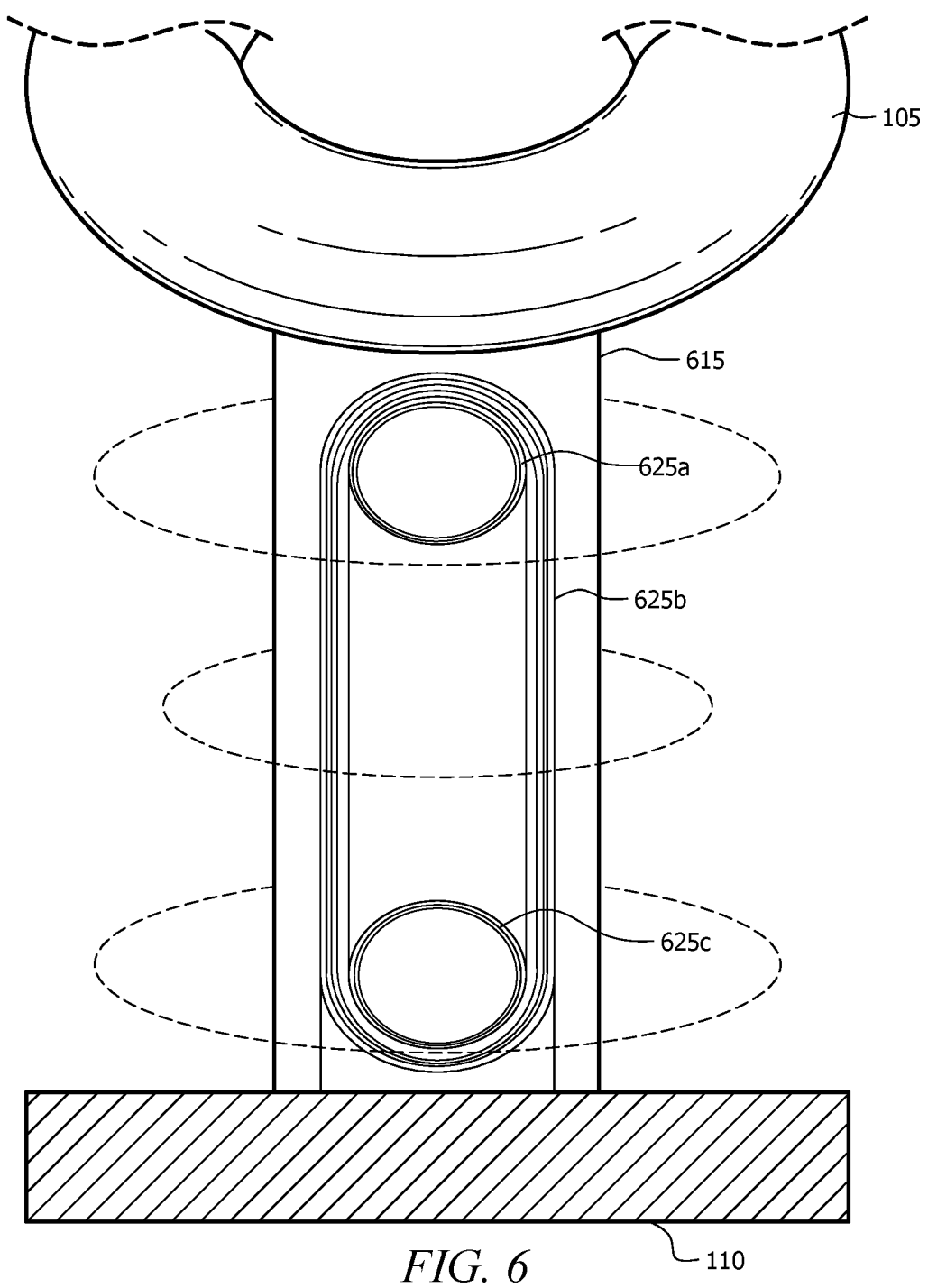
FIG. 6 illustrates an example support with electrical conducting material having a plurality of windings with different cross-sectional areas, according to certain embodiments.

FIG. 6 illustrates an example support 615 with electrical conducting material 625 having a plurality of windings with different cross-sectional areas, according to certain embodiments. Stated in a different way, support 615 may include electrical conducting material 625 that supports varying concentrations of electrical current along the length of support 615. Different from the embodiments discussed in relation to FIG. 4, the distance between portions of electrical conducting material 625 carry current in opposite directions need not vary. As shown in the illustrated example, a varying magnetosphere radius may be accomplished by providing windings that start and stop at different locations. In other words, the areas of the windings may vary.

As shown in the example in FIG. 6, windings of electrical conducting material 625a may loop around inside support 615 proximate internal magnetic coil 105, thereby creating a region within support 615 having a higher concentration of current, and therefore generate a magnetic field having a larger magnetosphere radius. Likewise, windings of electrical conducting material 625c may loop around inside support 615 proximate enclosure 110, thereby creating a region within support 615 having a higher concentration of current, and therefore generate a magnetic field having a larger magnetosphere radius. In contrast, the windings of electrical conducting material 625b near the middle of support 615 may have larger area and therefore have a lower concentration of current. Accordingly, the magnetosphere radius near the middle of support 615 may be less than the radii at the ends of support 615. In this manner, a magnetic field may be generated with electrical conducting material 625 within support 615 that varies along the length of support 615 and has a non-zero gradient.

FIG. 6 illustrates only a single example configuration of electrical conducting material 625 that has windings with different areas and/or different concentrations within support 615. Any suitable configuration varying the placement of windings of electrical conducting material 625 is contemplated herein. For example, configurations of electrical conducting material 625 with windings of different cross-sectional areas may be used to create any suitable magnetic field that varies along the length of support 615 and has a non-zero gradient in along that direction. In particular, electrical conducting material 625 may be configured to create the magnetosphere radii configurations shown in FIGS. 3A-D or any other configurations that may be used within plasma confinement system 100 to reduce plasma losses.

Figure 7:
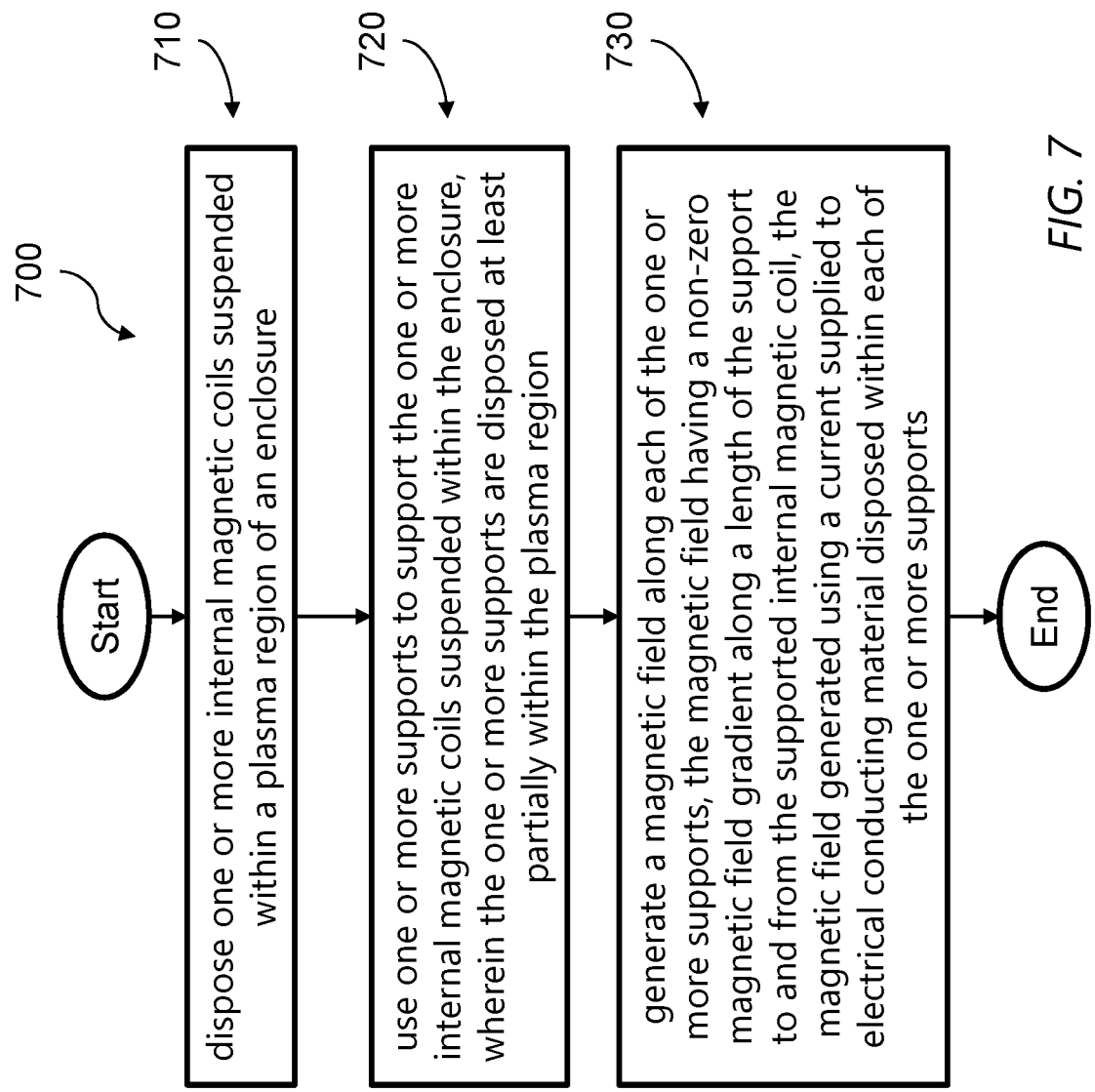
FIG. 7 illustrates a flowchart diagram of an example method for shielding structures exposed to plasma, according to certain embodiments.

FIG. 7 illustrates a flowchart diagram of an example method 700 for shielding structures exposed to plasma, according to certain embodiments. For example, method 700 may be implemented in a plasma confinement system, such as plasma confinement system 100, in which one or more components disposed or immersed in plasma need mechanical support. Method 700 may begin at step 710 wherein one or more internal magnetic coils, such as internal magnetic coil 105, is suspended within a plasma region of an enclosure. For example, an internal magnetic coil may be used in a plasma confinement system to generate magnetic fields to control and/or confine plasma, e.g., to generate energy using fusion processes. The internal magnetic coils may be advantageously disposed within a region within the system such that the internal magnetic coils are exposed to plasma, e.g., within a region of the enclosure where plasma is flowing or otherwise present during operation of the system. The coils may require mechanical support to maintain their position and their location away from unshielded components or other components of the plasma confinement system that are not designed to be immersed in plasma.

At step 520, one or more supports are used to support the one or more internal magnetic coils suspended within the enclosure. The one or more supports may be disposed at least partially within the plasma region. For example, if the internal magnetic coils are completely immersed in the plasma region, then the supports may be coupled to the internal magnetic coils within the plasma region. This may subject the supports to potential impacts of the plasma within the plasma region as a tradeoff of supporting the placement of the internal magnetic coils within the plasma region.

At step 730, a magnetic field may be generated along each of the one or more supports. The generated magnetic field may shield or "guard" the supports from incident plasma. For example, the generated magnetic field may modify the background magnetic field topology to modify the magnetic field lines proximate the supports. This may include creating magnetic field lines that extend around the supports instead of having a trajectory that intersects with a portion of the support. In certain embodiments, the generated magnetic field varies along the support along a length of the support to and from the supported internal magnetic coil using a current supplied to electrical conducting material disposed within each of the one or more supports. In particular, the electrical conducting material may be configured in a particular way within the support such that when it is supplied with electricity, the resulting magnetic field has a non-zero gradient in the direction along the length of the support. Put another way, the effective magnetosphere radius of the magnetic field generated in the support may vary along its length, as shown in example supports 215, 315, 515, and 615. In this manner, the support may generate a magnetic field that reduces plasma losses.

Modifications, additions, or omissions may be made to method 700 depicted in FIG. 7. Any steps may be performed in parallel or in any suitable order. Furthermore, method 700 may include more, fewer, or other steps. Additionally, one or more of the steps of method 700, or embodiments thereof, may be performed by any suitable component or combination of components of plasma confinement system 100 or supports 115, 215, 415, 515, and/or 615.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A plasma confinement system, comprising
    an enclosure;
    one or more internal magnetic coils suspended within the enclosure in a plasma region; and
    one or more supports configured to support the one or more internal magnetic coils suspended within the enclosure, wherein each support of the one or more supports comprises:
        a first end coupled to an interior portion of the enclosure;
        a second end opposite the first end, the second end coupled to a component disposed within the plasma region; and
        an electrical conducting material disposed between the first end and the second end, wherein the electrical conducting material comprises one or more first portions of electrical conducting material and one or more second portions of electrical conducting material, wherein the electrical conducting material is configured to conduct current in a first direction in the one or more first portions and in a second direction opposite the first direction in the one or more second portions;
        wherein the electrical conducting material is configured to, when supplied with one or more electrical currents, generate a magnetic field having a magnetic field gradient that varies along the support from the first end to the second end.

2. The plasma confinement system of claim 1, wherein the distance between the one or more first portion and the one or more second portion vary along the support between the first end and the second end.

3. The plasma confinement system of claim 1, wherein the electrical conducting material comprises a coil of electrical conducting material having a plurality of windings.

4. The support of claim 3, wherein the plurality of windings define more than one cross-sectional area.

5. The plasma confinement system of claim 1, wherein each of the one or more supports defines an elongated hole that has an axial direction matching a direction of plasma flow within the plasma region.

6. A support, comprising
    a first end coupled to an interior portion of an enclosure of a plasma confinement system;
    a second end opposite the first end, the second end coupled to a component disposed within a plasma region; and
    an electrical conducting material disposed between the first end and the second end, wherein the electrical conducting material comprises one or more first portions of electrical conducting material and one or more second portions of electrical conducting material, wherein the electrical conducting material is configured to conduct current in a first direction in the one or more first portions and in a second direction opposite the first direction in the one or more second portions;
    wherein the electrical conducting material is configured to, when supplied with one or more electrical currents, generate a magnetic field having a magnetic field gradient that varies along the support from the first end to the second end.

7. The support of claim 6, wherein the distance between the one or more first portion and the one or more second portion vary along the support between the first end and the second end.

8. The support of claim 6, wherein the electrical conducting material comprises a coil of electrical conducting material having a plurality of windings.

9. The support of claim 8, wherein the plurality of windings define single cross-sectional area.

10. The support of claim 8, wherein the plurality of windings define more than one cross-sectional area.

11. The support of claim 6, wherein each of the one or more supports defines an elongated hole that has an axial direction matching a direction of plasma flow within the plasma region.

12. The support of claim 6, wherein the support comprises a cross-sectional shape of an ellipsoid that is thinner in a direction orthogonal to the magnetic field.

* * * * *